Patented Oct. 2, 1934

1,975,223

UNITED STATES PATENT OFFICE 1,975,223

AZO DYES AND METHODS FOR THEIR PREPARATION

Samuel Coffey and Reginald William Everatt, Huddersfield, England, assignors to Imperial Chemical Industries Limited, a corporation of Great Britain No Drawing. Application July 11, 1933, Serial No. 679,938. In Great Britain June 28, 1932

16 Claims. (Cl. 260—78)

This invention relates to new coloring materials and more particularly refers to azo dyes especially adapted for imparting shades of excellent fastness to washing and light to textile material. It is an object of this invention to produce new and exceedingly useful intermediate compounds. A further object is to utilize these new intermediates in the production of dyes. A still further object is to produce azo dyes having excellent affinity for textile material, and particularly wool. An additional object is to produce dyes and pigments having attractive and desirable shades, especially the various shades of yellow. Additional objects will become apparent from a consideration of the following description.

These objects are attained according to the herein described invention, which in its preferred embodiment comprises producing new pyrazolone derivatives having the following general formula:

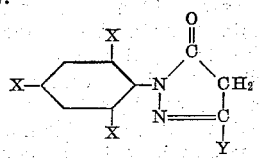

in which X represents a halogen atom, preferably a chlorine or bromine atom, and Y represents a methyl or carboxyl group. These new intermediates are then coupled with diazo or tetrazo compounds. The dyes thereby produced may be represented by the following general formula:

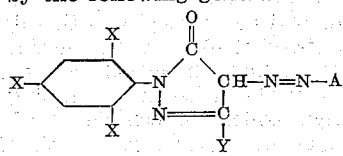

in which X and Y have the same meaning as heretofore given, and A represents the radical of the diazo component.

The invention may be more easily understood by a consideration of the following illustrative examples, in which the quantities are stated in parts by weight:

Example 1

212 parts of s-trichlorophenyl hydrazine (see Chattaway and Irving, J. C. S., 1931, 1741) were pasted with a little water and stirred to a cream with 2600 parts of water, sufficient sodium carbonate solution was added to give a faint alkaline reaction with brilliant yellow paper.

140 parts of 99% ethyl-aceto-acetate were then run in and the mixture was stirred for half an hour at 15–18° C., the temperature was then raised to about 50° C. in about 2 hours, and it was kept at 50–55° C. until hydrazone formation was complete, which was usually the case in 1–1½ hours. To effect pyrazolone formation 100 parts of soda ash were added, the temperature was raised to 90° C. and kept at 85–90° C. for about one hour, 270 parts of 32% caustic soda lye were then run in and the above temperature maintained for one hour, after which the solution was allowed to cool and stir overnight. It was filtered and the filtrate made acid to congo red paper by the addition of concentrated hydrochloric acid, the temperature being kept below 20° C.

The separated solid was filtered off, washed free of acid and dried at 70–80° C. It may be purified by recrystallization from alcohol.

Example 2

76.3 parts of s-tribromo-phenyl-hydrazine hydrochloride were stirred with 520 parts water and about 1 part of 10% aqueous solution of naphthalene-sulfonic-acid formaldehyde condensation product was added. The liquor was made just alkaline to brilliant yellow paper by the addition of soda ash. 28.8 parts of ethyl-aceto-acetate were added at 18° C. and the mixture was stirred for half an hour. The temperature was then slowly raised to 65° C. and kept there until hydrazone formation was complete. This took about 1½ hours. The temperature was then raised to 85° C. and 34 parts of 32% caustic soda lye were run in to give a strong reaction to brilliant yellow paper, and the mixture was stirred at 85° C. for 3 hours. It was then allowed to cool, filtered and the filtrate was acidified by the addition of concentrated hydrochloric acid at or below 20° C. The precipitate which was produced was filtered off, washed with cold water and dried at 70–80° C. The new compound may be purified if desired by recrystallization from alcohol.

Example 3

38 parts of oxal-acetic ester were stirred and 37 parts of s-trichlorophenyl-hydrazine were added gradually at 20–30° C. The thin brown cream obtained was stirred for half an hour; the temperature was then raised to 35° C. and kept at 35–45° C. for about 1½ hours. A turbid light brown oil was formed. The temperature was raised to 100° C. and kept at 100–110° C. for about 2 hours i. e. until a clear oil free from turbidity was obtained.

400 parts of water were then added and the mixture was stirred and cooled to 85° C. when 81 parts of 32% caustic soda lye were added. The temperature was maintained at 85–90° C. for 1½–2 hours until practically all the oil had dissolved.

The solution was cooled to 20° C. and was then filtered to remove a small quantity of tar. The filtrate was cooled to 10° C. and acidified to congo red at 10–15° C. by adding 36% hydrochloric acid.

The solid was filtered off, pressed, washed, and dried at 60–70° C.

The crude pyrazolone obtained melted at 206–208° C. with decomposition. After recrystallization from glacial acetic acid the melting point was 240° C. with decomposition.

Example 4

38.2 parts of s-tribrom-phenyl-hydrazine hydrochloride, 400 parts of water and 4 parts of a 10% aqueous solution of formaldehyde-naphthalene-sulfonic-acid-condensation product were stirred at 10–15° C. and 28 parts of powdered 84% sodium oxal-acetic ester were added. The mixture was stirred at 10–15° C. for half an hour. Glacial acetic acid was added to keep the mixture acid to litmus. It was then heated to 50° and kept at 50–60° C. for about an hour. A clotted suspension was formed.

The temperature was raised to and kept at 85–90° C. for one hour. The mixture first becomes more orange in color and a reddish oil then separates. It was made alkaline to brilliant yellow by the addition of about 8 parts of soda ash and the temperature was maintained at 85–90° C. for one hour. Most of the oil dissolved. 81 parts of 32% caustic soda lye were run in and the mixture was stirred at the above temperature for 1½ hours longer. It was then filtered hot, if necessary, to remove black tar and the filtrate was cooled to below 20° C. and acidified to congo red by addition of about 55 parts of 36% hydrochloric acid. The solid which came down was filtered, washed, and dried at 50–60° C.

The crude solid was pinkish in color and melted with decomposition at about 230° C. After recrystallization from glacial acetic acid it had a melting point of 250° C.

Example 5

34.4 parts of benzidine 2-2'-disulfonic acid were tetrazotized in the usual way with the aid of 13.8 parts of sodium nitrite, and the tetrazo suspension was added at about 10° C. to a solution of 55.5 parts of 1(s-trichlorophenyl)-3-methyl-5-pyrazolone (cf. Example 1) in 400 parts of water containing 8 parts of sodium hydroxide. When all the tetrazo suspension had been added the mineral acid reaction was removed by addition of sufficient sodium acetate and coupling was allowed to proceed for about 12 hours. A small amount of common salt was added, if necessary, to complete the precipitation of the dyestuff which was then filtered off and dried. When ground it was a bright yellow powder which yielded very clear and bright greenish yellow shades on wool of very good fastness to washing and milling.

If the corresponding bromo-derivative was used in place of the 1(s-trichlorophenyl)-3-methyl-5-pyrazolone the dyestuff formed yielded somewhat redder shades on wool of similarly good fastness.

Example 6

25.3 parts of 3-3'-dichloro-benzidine were tetrazotized in the usual way. The tetrazo solution was added at about 15° C. to a suspension of 55.5 parts of 1(s-trichlorophenyl)-3-methyl-5-pyrazolone (cf. Example 1) in 1000 parts of water, the suspension being obtained by dissolving the pyrazolone in water containing 8 parts of sodium hydroxide and precipitating with dilute acid. When all the tetrazo solution had been added, coupling was allowed to proceed for about 12 hours. The insoluble dyestuff was then filtered, washed, and dried. The so-obtained bright yellow pigment was of good fastness to oil and light.

Example 7

The tetrazo compound obtained in the customary manner from 21.2 parts of 2-2'-tolidine was added with stirring, at a temperature not exceeding 10° C., to a solution of 61.5 parts of 1(s-trichlorophenyl)-5-pyrazolone-3-carboxylic acid in 450 parts of water containing 16 parts of sodium hydroxide. Coupling was rapid and the reaction of the coupling mixture was maintained alkaline by addition of sodium carbonate as necessary. When completed, the dyestuff was isolated by addition of common salt. On grinding it was a yellow powder which gave from an acid bath clear bright yellow shades on wool of very good fastness to washing, milling and light.

By using the corresponding s-tribromo compound as coupling component slightly redder shades of yellow were obtained of similar good fastness properties.

Example 8

The tetrazo derivative obtained from 33 parts of 2-2'-5-5'-tetramethyl-4-4'-diamino-triphenyl-methane was coupled in alkaline medium with 61.5 parts of 1(s-trichlorophenyl)-5-pyrazolone-3-carboxylic acid as in Example 7. At the conclusion of the coupling the dyestuff was isolated by addition of salt. When dried and ground it was a bright yellow powder which dyed wool from an acid bath in bright yellow shades of very good fastness to washing, milling and light.

Similar shades were given by the corresponding dyestuff using the 1(s-tribromo-phenyl)-5-pyrazolone-3-carboxylic acid as coupling component, the dyeings exhibited fastness properties of the same high order.

Example 9

25.3 parts of 1-amino-benzene-2-5-disulfonic acid were diazotized as usual and the diazo compound was stirred at 10° C. into a solution of 27.75 parts of 1(s-trichlorophenyl)-3-methyl-5-pyrazolone in 200 parts of water containing 4 parts of sodium hydroxide. On completion of the coupling the dyestuff was isolated by addition of a little common salt, filtered off, dried and ground. It was a yellow powder which yielded from an acid bath level bright greenish-yellow shades on wool of very good fastness to soaping and light.

By using the equivalent amount (41.1 parts) of 1(s-tribromo-phenyl)-3-methyl-5-pyrazolone as coupling component the dyestuff which was obtained dyed wool in slightly redder shades of similar levelling capacity and good fastness to soaping and light.

Example 10

25 parts of the diazo component obtained from 1-amino-2-hydroxy-naphthalene-4-sulfonic acid were suspended in 60 parts of water and added at a temperature of 15° C. to a solution, made up from 28 parts of 1(s-trichlorophenyl)-3-methyl-5-pyrazolone dissolved in 170 parts of water and 4 parts of sodium hydroxide, in which there had been previously added 6.5 parts of sodium carbonate. On completion of the combination the dyestuff was isolated by the addition of approximately 20 parts of 26% hydrochloric acid, filtered off, dried and ground. It was an orange-red powder which dyed wool from an acid bath in level red shades which could be rendered deeper in shade and of excellent fastness to light and washing by after-chroming.

It is to be understood that the aforementioned examples were given merely for purposes of illustration and were not intended as a limitation upon the scope of the instant application. As heretofore mentioned, this invention comprises within its scope the production of azo dyes containing the exceedingly useful and entirely new 1-s-trihalogeno-phenyl-3-methyl-(or carboxyl) 5-pyrazolone intermediate as a component thereof. This component may be coupled with a diazotized aromatic amine or a tetrazotized aromatic diamine, the resulting compound giving surprisingly good results when used as a dye or pigment.

It is furthermore to be understood that the aromatic amines of diamines may contain one or more azo groups. In other words, the resulting compounds may be trisazo or polyazo dyes containing more than three azo groups, instead of the monoazo and disazo dyes disclosed in the preceding examples. Exceptionally good results are obtained by coupling these new pyrazolone intermediates with tetrazotized members of the benzidine, tolidine and triphenyl-methane series, as well as diazotized members of the benzene and naphthalene series. However, the invention is also adapted to the use of numerous other diazo and tetrazo compounds, and is not limited to members of the aforementioned series.

The invention, likewise, comprises within its scope the use of diazo compounds having a hydroxy group in ortho position to the diazo group, this hydroxy group being capable of conversion into divalent or polyvalent metal compounds either in substance or on the fiber. These metal derivatives are exceptionally useful, and in many cases produce pigments and dyes which are more satisfactory than the non-metal compounds. One skilled in the art will ordinarily have no difficulty in determining when it is advisable to utilize metal derivatives of these azo compounds as dyes and pigments.

Production of the pyrazolone derivatives is accomplished by condensing together s-trihalogeno-phenyl-hydrazine and an aceto-acetic or oxal-acetic ester. As previously mentioned, the trichloro or tribromo derivatives are preferable. When s-trichloro-(or tribromo) phenyl-hydrazine is condensed with an aceto-acetic ester, for example ethyl-aceto-acetate, s-trichloro-(or tribromo) phenyl-3-methyl-5-pyrazolone is obtained. By substituting for the aceto-acetic ester an oxal-acetic ester, for example ethyl-oxal-acetate, a trichloro-(or tribromo) phenyl-3-carboxy-5-pyrazolone is obtained.

The new intermediate described herein are surprisingly effective in producing dyes and pigments having exceptionally good properties. These dyes impart colors of satisfactory fastness to textile materials, particularly wool. The shades usually range from yellow to red, and are very clear and bright. When used as a dye these compounds impart to the fiber dyed attractive colors of excellent fastness to washing and milling.

As many apparently widely different embodiments of this invention may be made without departing from the spirit and scope thereof, it is to be understood that we do not limit ourselves to the specific embodiments thereof except as defined in the appended claims.

We claim:

1. A process for producing azo dyes which comprises coupling a tetrazotized aromatic diamine with a member selected from the group consisting of s-trihalogeno-phenyl-3-methyl-5-pyrazolone and s-trihalogeno-phenyl-3-carboxyl-5-pyrazolone.

2. A process for producing azo dyes which comprises coupling a tetrazotized aromatic diamine with a member selected from the group consisting of s-trichlorophenyl-3-methyl-5-pyrazolone, s-trichlorophenyl-3-carboxyl-5-pyrazolone, s-tribromophenyl-3-methyl-5-pyrazolone, and s-tribromophenyl-3-carboxyl-5-pyrazolone.

3. A process for producing azo dyes which comprises coupling a member selected from the group consisting of tetrazotized-benzidine-2-2'-disulfonic acid, 3-3'-dichloro-benzidine, 2-2'-tolidine, and 2-2'-5-5'-tetramethyl-4-4'-diamino-triphenyl-methane with a member selected from the group consisting of s-trichlorophenyl-3-methyl-5-pyrazolone, s-trichlorophenyl-3-carboxyl-5-pyrazolone, s-tribromophenyl-3-methyl-5-pyrazolone, and s-tribromophenyl-3-carboxyl-5-pyrazolone.

4. A process for producing azo dyes which comprises coupling a tetrazotized diamine selected from the group consisting of benzidine-2-2'-disulfonic acid and 3-3'-dichloro-benzidine with a member selected from the group consisting of s-trichlorophenyl-3-methyl-5-pyrazolone and s-tribromophenyl-3-methyl-5-pyrazolone.

5. A process for producing azo dyes which comprises coupling a tetrazotized diamine selected from the group consisting of 2-2'-tolidine and 2-2'-5-5'-tetramethyl-4-4'-diamino-triphenyl-methane, with a member selected from the group consisting of s-trichlorophenyl-3-carboxyl-5-pyrazolone and s-tribromophenyl-3-carboxyl-5-pyrazolone.

6. A process for producing an azo dye which comprises coupling tetrazotized benzidine-2-2'-disulfonic acid with s-trichlorophenyl-3-methyl-5-pyrazolone.

7. A process for producing an azo dye which comprises coupling tetrazotized 3-3'-dichloro-benzidine with s-trichlorophenyl-3-methyl-5-pyrazolone.

8. A process for producing an azo dye which comprises coupling tetrazotized 2-2'-tolidine with s-trichlorophenyl-3-carboxyl-5-pyrazolone.

9. Azo dyes having the following general formula:

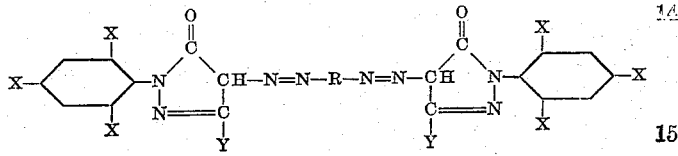

in which X represents a halogen atom, Y represents a methyl or carboxyl group, and R represents the radical of an aromatic diamine.

10. Azo dyes having the following general formula:

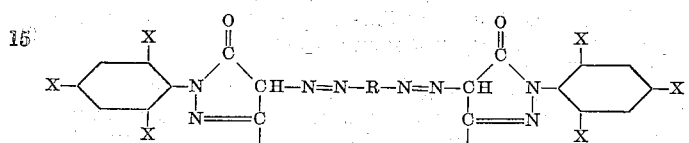

in which X represents a chlorine or bromine atom, Y represents a methyl or carboxyl group, and R represents the radical of an aromatic diamine.

11. Azo dyes having the following general formula:

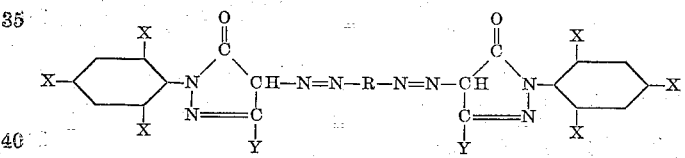

in which X represents a chlorine or bromine atom, Y represents a methyl or carboxyl group, and R represents the radical of benzidine-2-2'-disulfonic acid, 3-3'-dichloro-benzidine, 2-2'-tolidine, or 2-2'-5-5'-tetramethyl-4-4'-diamino-triphenyl-methane.

12. Azo dyes having the following general formula:

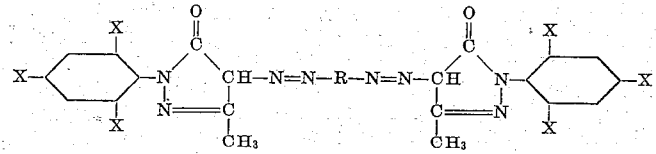

in which X represents a chlorine or bromine atom and R represents the radical of benzidine-2-2'-disulfonic acid or 3-3'-dichloro-benzidine.

13. Azo dyes having the following general formula:

in which X represents a chlorine or bromine atom, and R represents the radical of 2-2'-tolidine or 2-2'-5-5'-tetramethyl - 4 - 4' - diamino - triphenyl-methane.

14. An azo dye having the following formula:

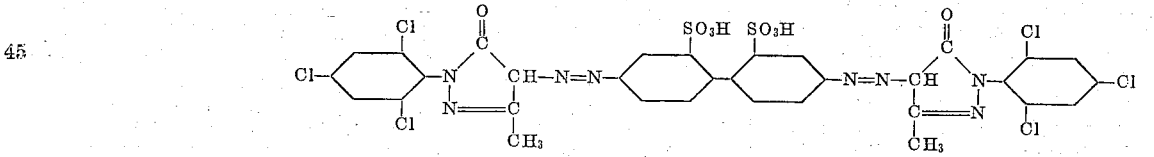

15. An azo dye having the following formula:

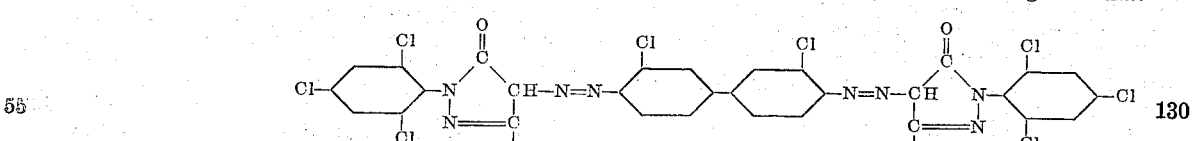

16. An azo dye having the following formula:

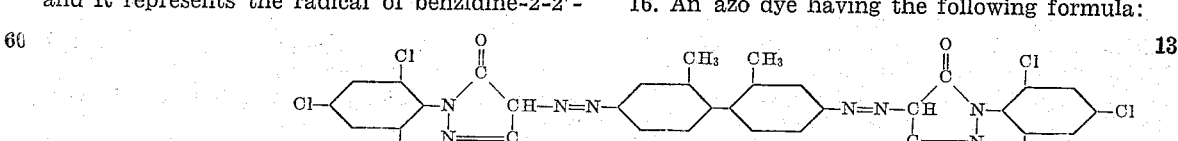

SAMUEL COFFEY.
REGINALD WILLIAM EVERATT.